United States Patent [19]

Seiz

[11] 3,710,524
[45] Jan. 16, 1973

[54] RESILIENT VEHICLE GUIDEWAY END ABUTMENTS

[76] Inventor: Edward A. Seiz, 136 East Third Street, Lansdale, Pa. 19446

[22] Filed: May 6, 1971

[21] Appl. No.: 140,850

[52] U.S. Cl.................52/174, 104/247, 214/38 BB, 238/4, 256/13.1
[51] Int. Cl.............B61f 9/00, E01f 9/00, E04h 6/42
[58] Field of Search..104/242, 243, 247; 214/16.4 A, 214/16.4 B, 38 BB; 238/4; 52/174; 256/1, 13.1

[56] References Cited

UNITED STATES PATENTS

| 1,808,767 | 6/1931 | DeGloria et al............................256/1 |
| 2,776,116 | 1/1957 | Brickman..............................256/13.1 |
| 2,853,239 | 9/1958 | Morgan....................................238/4 |
| 1,600,165 | 9/1926 | Dennebaum..........................256/13.1 |
| 2,154,818 | 4/1939 | Mayer...................................256/13.1 |

FOREIGN PATENTS OR APPLICATIONS

| 257,298 | 9/1964 | Great Britain..................214/16.4 A |
| 423,191 | 4/1967 | Switzerland......................214/38 BB |

*Primary Examiner*—Gerald M. Forlenza
*Assistant Examiner*—Howard Beltran
*Attorney*—Howson & Howson

[57] ABSTRACT

A guideway which directs an order pick-up vehicle in an aisle between storage structures in a warehouse is provided with a resilient entryway to assist the operator of the vehicle in aligning the vehicle with the guideway prior to travel therein. The entryway comprises a pair of spring members each having a U-shaped plan configuration and each being mounted at one end to one of the parallel tracks forming the guideway. The spring members diverge away from their connected ends to form a tapered entry to the guideway and the spring members have free ends which are constrained against displacement transversely outward of the tracks. If the vehicle is not properly aligned with the guideway during insertion, the spring members operate to absorb some of the kinetic energy of the vehicle to thereby yieldably arrest motion of the vehicle.

7 Claims, 4 Drawing Figures

PATENTED JAN 16 1973 3,710,524
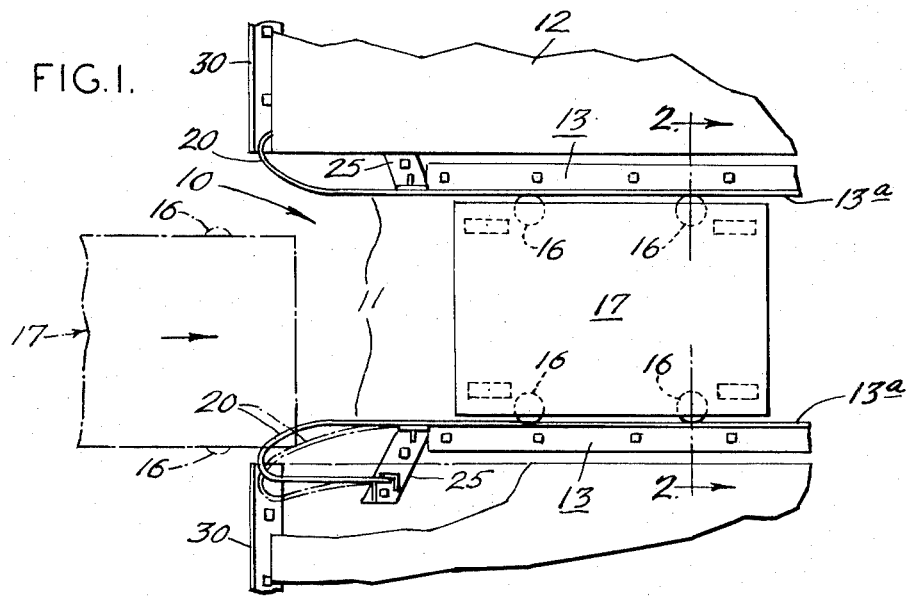
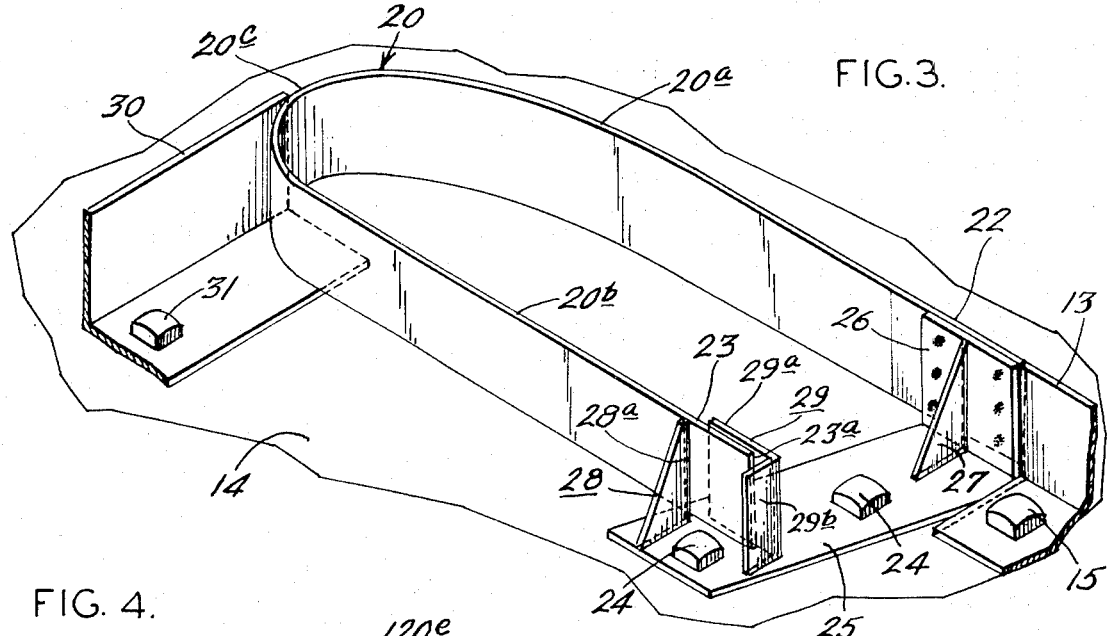
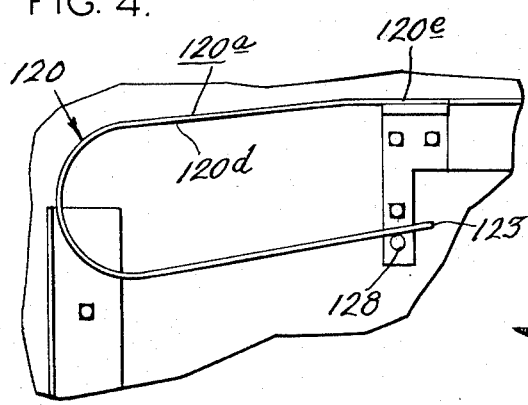
INVENTOR:
EDWARD A. SEIZ
BY
Howson & Howson
ATTYS

RESILIENT VEHICLE GUIDEWAY END ABUTMENTS

The present invention relates to storage systems in which an order pick-up vehicle is automatically guided in a guideway between adjacent storage structures, and more particularly, the present invention relates to entryways for such guideways to assist the vehicle-operator in aligning the vehicle with the guideway prior to automatic travel therein.

In order to conserve floorspace, the storage structures in some warehouses are located closely adjacent one another so as to form relatively narrow aisles therebetween, and vehicles commonly referred to as "order pick-up trucks" are guided in the aisles by means of a guideway. The conventional guideway comprises spaced parallel tracks which are mounted on the floor of the warehouse and which have confronting surfaces for engaging guide wheels mounted to rotate on vertical axes on the lower sides of the vehicle. A minimum clearance exists between the tracks and the guide wheels on the truck; thus, once in the guideway, the truck steers itself. Because of the relatively small clearance, however, it has been difficult for a truck operator to align the truck with the ends of the guideway prior to travel therein. Moreover, unless the operator is cautious in aligning the truck with the guideway, the truck may strike and possibly damage the guideway and/or the adjacent storage structures. Until the present invention, there has not been available satisfactory means for assisting a truck-operator in aligning the truck with the guideway.

With the foregoing in mind, it is the primary object of the present invention to provide a novel entryway for a guideway between racks in a warehouse.

It is another object of the present invention to provide for a vehicle guideway an improved entryway constructed of spring members which operate to absorb some of the kinetic energy of the vehicle in the event that the vehicle is not properly aligned with the guideway during insertion to avoid damaging the guideway and/or adjacent structures.

As a further object, the present invention provides a unique vehicle entryway which is of simple but rugged construction and which because of its simplicity is relatively economical to fabricate.

More specifically, in the present invention a shock-absorbing entryway is provided for a vehicle guideway which is mounted between storage structures in a warehouse and which is adapted to automatically steer the vehicle to enable the operator of the vehicle to select articles from the structure without having to steer the vehicle. The entryway is formed by a pair of U-shaped spring members each of which has one leg connected to one of the parallel tracks defining the guideway and each of which has another leg extending substantially parallel to the connected leg and terminating in a free end. The spring members diverge away from one another from their points of connection with the tracks to provide a tapered entrance to the guideway. Means is provided to constrain the free end of each spring member against displacement transversely of the tracks, and the constrainment means includes a base element to which structural elements are mounted for slidably receiving the free end of the spring member and supporting the free end against outward displacement. A barrier is provided adjacent the reversely-curved portion of each spring member, an; the barrier extends transversely to the tracks to prevent the vehicle from engaging behind the spring member. The spring members operate to absorb some of the kinetic energy of the vehicle should the vehicle be improperly aligned with the guideway during insertion.

These and other objects, features, and advantages of the present invention should become apparent from the following description when taken in conjunction with the accompanying drawings in which:

FIG. 1 is a plan view of guideway having an entryway embodying the present invention;

FIG. 2 is a sectional view taken along line 2—2 of FIG. 1;

FIG. 3 is a fragmentary perspective view of the lower portion of the entry illustrated in FIG. 1; and FIG. 4 is a plan view of a modified embodiment of the present invention.

Referring now to the drawing, there is illustrated in FIG. 1 an entryway 10 for a guideway 11 between adjacent storage structures 12,12 in a warehouse. The guideway 11 comprises spaced parallel tracks which in the present instance are angle members 13,13 (FIG. 2) secured to a supporting surface 14 by means of threaded fasteners or lag screws 15. As may be seen in FIG. 2, the angle members 13,13 have upstanding surfaces 13a,13a confronting one another and adapted to engage guide wheels 16,16 mounted for rotation on vertical axes on the sides and adjacent the front and rear ends of a so-called "order pick-up" vehicle 17. The angle members 13,13 are spaced from one another a distance which is slightly greater than the overall widthwise dimension of the vehicle 17, thereby providing a relatively small clearance C between the vehicle 17 and the tracks 13,13. Thus, once the vehicle 17 is inserted in the guideway 11, the wheels 16,16 engage the surfaces 13a,13a to steer the vehicle 17 independently of the control of its operator.

Because of the relatively small clearance C, it is necessary for the vehicle 17 to be aligned accurately with the guideway 11 for insertion therein. At present, such alignment is a slow precess, with the vehicle-operator engaging in a series of short forward and rearward maneuvers adjacent the end of the guideway 11. During maneuvering, it is not uncommon for the vehicle to strike the storage structures adjacent the ends of the tracks. Since conventional order pick-up vehicles may weigh in excess of one thousand pounds, it should be apparent that forces transmitted to the storage structures upon impact can cause serious damage to the structures and repeated impact or impact at more than a few miles per hour could cause such structures to fail.

The present invention eliminates the aforementioned problems. To this end, the entryway 10 is constructed to have shock-absorbing capabilities for yieldably arresting motion of the order pick-up vehicle in the event that it is improperly aligned with the guideway 11 during insertion. In the illustrated embodiments, the entryway 10 comprises complementary spring members 20,20 disposed on opposite sides and at one end of the guideway 11 to engage an improperly-aligned vehicle. As may be seen in FIG. 3, each spring member 20 has a substantially U-shaped plan configuration with an exposed vehicle-engaging leg 20a and a protected leg 20b extending substantially parallel thereto, the legs being connected by an arcuate or reversely-curved portion 20c. The vehicle-engaging leg 20a of each spring member 20 diverges away from the guideway 11. Thus, the spring members 20,20 cooperate to form a tapered entrance into the guideway 11.

The spring members 20,20 are securely mounted to the guideway 11. To this end, each spring member 20 has one end 22 mounted stationary to the end of the track 13 as by welding, and each spring member 20 has a free end 23 constrained against displacement in a direction transverse of the tracks 13,13 but capable of limited displacement in a direction parallel to the tracks 13,13. In the present instance, the spring member 20 is mounted to a flat, plate-like base 25 which extends at an angle away from the track 13 to underline the free end 23 and which, like the track members 13,13, is fastened to the floor or supporting surface 14 by means of threaded fasteners or lag screws 24,24. An upstanding mounting plate 26 is welded or otherwise fastened to the base plate 25 to fixedly mount the stationary end 22 of the spring member 20 as by spot welds, threaded fasteners or the like, and a gusset plate 27 is fastened to the base plate 25 and the mounting plate 26 to reinforce the mounting of the spring member 20. Preferably, the base plate 25 is secured to the floor 14 so as to dispose the vehicle engaging surface 20a of the spring member 20 in endwise adjustment and substantially coplanar with the surface 13a of the track 13 for providing a smooth transition between the spring member 20 and its associated track.

For the purpose of constraining the free end 23 of the spring member 20 in a manner which increases the energy-absorbing capacity of the spring member 20, constraint means is provided on the base plate 25 a spaced distance from the mounting plate 26. In the present instance a slot-like channel constrains the free end 23 and in the embodiment illustrated in FIG. 3, the constraint means includes an upstanding triangular bearing plate 28 fastened to the base plate 25 and having an edge 28a engaging the free end 23 of the spring member 20 to prevent displacement of the free end 23 transversely outward of the guideway 11. The free end 23 is constrained against displacement in the opposite direction toward the track 13 by an upstanding irregular angle member 29 which is also fastened to the base plate 25 adjacent the free end 23. The long leg 29a of the angle member 29 engages the free end 23 on the side thereof opposite the bearing plate 28, and the other or shorter leg 29b of the angle member 29 extends across the terminus 23a of the free end 23 to engage the terminus 23a for preventing substantial displacement of the leg 20b in a direction parallel to the guideway 11. Thus, upon impact of the spring member 20 by a vehicle, the slot formed between the members 28 and 29 causes both legs 20a and 20b of the spring member 20 to bend with respect to their ends, thereby increasing their energy-absorbing capacity.

In order to prevent the vehicle 17 from engaging behind the spring members 20,20 and possibly damaging them, barriers 30,30 are provided. As best seen in FIGS. 1 and 3, the barriers 30 include angle elements which are similar to the angle members 13,13 forming the tracks of the guideway 11. Like the track angle members, the barrier angles 30,30 are fastened to the support surface 14 by means of lag screws 31,31 and in the present instance, the barrier angles 30,30 extend widthwise of the storage structures 12,12 and transversely outward of the guideway 11 at substantially right-angles to the tracks 13,13. Each barrier angle 30 terminates adjacent the arcuate portion 20c of the spring member and is spaced from the spring member 20 a sufficient distance to enable the spring members 20 to deflect into the position illustrated in broken lines in FIG. 1 when struck by a vehicle. Thus, the barriers protect the legs 20b, 20b being struck from behind by the vehicle 17.

In installations where less energy-absorption is desired, a modified embodiment of the present invention is provided. As seen in FIG. 4, the modified embodiment is similar to the first-mentioned embodiment; however, the free end 123 of the spring member 120 is engaged only by an upstanding pin 128 to prevent lateral displacement of the free end. Moreover, rather than continuously curving outwardly from its mounting location, the modified spring member 120 has a vehicle-engaging leg 120a formed of straight portions 120d and 120e angulated with respect to one another. With this structure, the pin 128 does not completely constrain the free end 123 of the spring member 120 in a manner which causes both legs to bend equally for absorbing impact energy. Rather, bending occurs primarily in only one leg, thereby reducing the energy-absorbing capacity of the structure.

Actual tests of an entryway having members 20,20 of spring steel and each with a width of 6 inches (corresponding to the height of the tracks 13), a thickness of ⅜ – ½ inches, an overall length of 38 ½ inches, and a dimension across the legs of 13 inches have been successful. Of course, these dimensions may be varied for different installations, depending on many factors such as the desired energy absorption, the permissable deflection of the spring member, and the like. Accordingly, the above dimensions are merely exemplary of an entryway which has operated satisfactorily in use.

In view of the foregoing, it should be apparent that an improved entryway has now been provided for use in conjunction with a guideway in an aisle between racks in a warehouse to assist operators of order pickup vehicles in aligning the vehicle with the guideway.

While preferred embodiments of the present invention have been described in detail, various modifications, alterations and changes may be made without departing from the spirit and scope of the present invention as defined in the appended claims.

I claim:

1. In a warehouse having storage structures located in parallel relation and having parallel tracks engageable by a vehicle for directing movement of the vehicle therealong the improvement comprising: guide means located at an end of said tracks and operable to be contacted by said vehicle to assist in aligning said vehicle with said tracks, said guide means comprising a pipe of elongated flexible flat spring members each having a stationary end mounted adjacent said end of each of said tracks and a vehicle-engaging leg portion extending longitudinally beyond each track end and laterally away from said stationary end to define an extension of each said track, extension deflecting transversely away from said aisle when struck by the vehicle to absorb at least a portion of the kinetic energy of the vehicle and elastically returning to its undeflected position when the vehicle disengages the extension.

2. Apparatus according to claim 1 wherein said flexible member has a substantially U-shaped plan configuration with another leg portion extending in spaced relation with the vehicle-engaging leg and terminating in a free end located a spaced distance outwardly from said stationary end, said guide means including means engaging said other leg of the member adjacent said free end to constrain said free end against substantial displacement transversely of said track and to permit limited displacement of said free end longitudinally of said track upon impact of said member by said vehicle.

3. Apparatus according to claim 2 wherein said constraint means includes a base extending between said stationary end of the member and said free end of said member, bracket means on said base mounted adjacent said stationary end, means connecting said stationary end to said bracket means, and means on said base mounted adjacent said free end to define a slot slidably receiving said flexible member.

4. Apparatus according to claim 3 wherein said bracket means includes an upstanding mounting plate fastened to said base, a gusset plate secured to said base and said upstanding plate; and said slot-defining means includes an upstanding angle member having one leg engaging alongside said flexible member and it other leg extending across the terminus of said free end, and a bearing plate mounted to said base, said bearing plate having an edge engaging said flexible member adjacent said free end on the side thereof opposite said one leg of the angle member, whereby each leg portion of the flexible member is capable of bending with respect to its respective end to store impact energy.

5. Apparatus according to claim 1 including a supporting surface underlying said guide means and said track, means fastening said guide means and track to said supporting surface, and a barrier mounted to said supporting surface, said barrier extending away from said flexible member in a direction transverse to said track for preventing said vehicle from engaging behind said flexible member.

6. In a warehouse having storage structures in spaced parallel relation and having parallel tracks extending in an aisle between said structures to define a guideway for directing a vehicle therebetween, the improvement comprising: entryway means located at an end of said guideway to assist in aligning the vehicle with the guideway, said entryway including complementary flexible flat spring members associated with said tracks and shaped to converge toward said guideway, said spring members each having one end securely mounted adjacent said tracks and each having a vehicle-engaging surface extending longitudinally of and laterally outward of said tracks in an undeflected position, each of said flexible members being capable of deflecting outwardly upon impact the vehicle to absorb some of its kinetic energy and being capable of elastically returning to its undeflected position upon disengagement of the vehicle from the spring member.

7. Apparatus according to claim 6 wherein said tracks have vertically-disposed confronting surfaces for engaging therebetween said vehicle, and said flexible members each have a similarly-disposed vehicle engaging surface disposed coplanar with its associated track-surface at its mounting location to form a smooth transition between the member and the track.

* * * * *

UNITED STATES PATENT OFFICE
CERTIFICATE OF CORRECTION

Patent No. 3,710,524    Dated January 16, 1973

Inventor(s) Edward A. Seiz

It is certified that error appears in the above-identified patent and that said Letters Patent are hereby corrected as shown below:

Column 2, line 1, change "an;" to --and--;
         line 44, change "precess" to --process--.
Column 4, line 55, after "in" insert --spaced--;
         line 60, change "pipe" to --pair--;
         line 66, after "each" delete "said";
         line 66, after "track," insert --said track--.

Signed and sealed this 10th day of July 1973.

(SEAL)
Attest:

EDWARD M. FLETCHER, JR.　　　Rene Tegtmeyer
Attesting Officer　　　　　　Acting Commissioner of Patents